Aug. 19, 1969  R. H. HANSEN ET AL  3,462,335
BONDING OF THERMOPLASTIC COMPOSITION WITH ADHESIVES
Filed Aug. 4, 1966
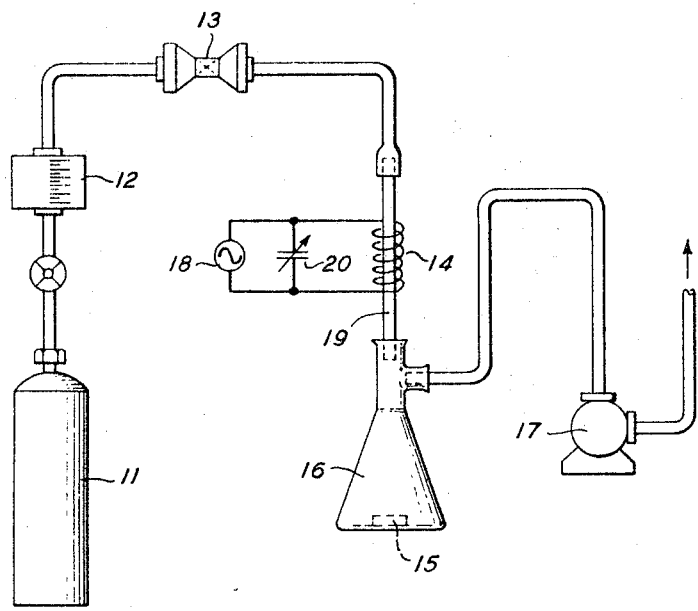
INVENTORS *R.H. HANSEN*
*H. SCHONHORN*
BY
ATTORNEY United States Patent Office 3,462,335
Patented Aug. 19, 1969

3,462,335
BONDING OF THERMOPLASTIC COMPOSITION
WITH ADHESIVES
Ralph H. Hansen, Short Hills, and Harold Schonhorn,
New Providence, N.J., assignors to Bell Telephone
Laboratories, Incorporated, Murray Hill, Berkeley
Heights, N.J., a corporation of New York
Continuation-in-part of application Ser. No. 486,779,
Sept. 13, 1965. This application Aug. 4, 1966, Ser.
No. 570,220
Int. Cl. B29c 27/10; C09j
U.S. Cl. 156—272                          13 Claims

ABSTRACT OF THE DISCLOSURE

Structural bonding of hydrocarbon, fluorocarbon and polyamide polymers with commercially available adhesives may be effected in the absence of a preliminary surface modification of the polymer by subjecting the polymer to a stream of an excited inert gas.

This application is a continuation-in-part- of our copending application, Ser. No. 486,779, filed Sept. 13, 1965, now abandoned.

This invention relates to a technique for bonding thermoplastic compositions to adhesives. More particularly, the present invention is directed to a technique for bonding hydrocarbon, fluorocarbon, or polyamide polymers with conventional adhesives.

It has generally been accepted in the adhesives industry that the noted polymers cannot be structurally bonded with any of the commercially available adhesives in the absence of a preliminary surface modification, such as oxidation, defluorination, et cetera. Unfortunately, the various surface modifications proposed by the industry tend to improve one property at the expense of another, so resulting in a composition which is undesirable in many applications.

In accordance with the present invention, the limitations of the prior art are effectively overcome by a technique wherein hydrocarbon, fluorocarbon, or polyamide polymers destined for bonding with an adhesive are bombarded with a stream of an excited inert gas. The resultant compositions have been found to retain their original electrical characteristics as well as their chemical integrity, as indicated by wettability data. Compositions treated in the described manner are capable of bonding with conventional adhesives so as to result in structures evidencing tensile shear strengths unsurpassed by those of the prior art.

It will be understood by those skilled in the art that the main impact of the present invention resides in the discovery that the noted polymers may be bonded with conventional adhesives without undergoing a preliminary surface treatment with the corresponding degradation of electrical properties.

The invention has been described largely in terms of bonding polymers with epoxy resin adhesives. However, it will be understood that the polymers described herein may be bonded with any conventional adhesive utilized in the industry, for example, polyamides, silicones, polysulfides, et cetera.

The invention will be more readily understood by reference to the accompanying drawing wherein:

The figure is a diagram of a typical system used in the practice of the present invention.

The polymers employed in the practice of the present invention may be selected from among any hydrocarbon, fluorocarbon or polyamide polymers evidencing weak boundary layers, as manifested by their inability to form strong adhesive joints. Typical polymers suitable in the practice of the present invention are polyethylene, nylon, tetrafluoroethylene, polyvinylfluoride, et cetera.

The epoxy resin adhesives employed in the practice of the present invention may be selected from among any of the commercially available materials. However, in order to obtain high strengths, the adhesive must wet the substrate reasonably well, e.g., it should evidence a surface tension less than 50 dynes/cm. In order to utilize materials evidencing surface tensions beyond the noted maximum, a surfactant may be employed to reduce the surface tensions to an acceptable value. A particularly useful adhesive for the practice of the invention comprises a mixture of the diglycidyl ether of bisphenol A and diethylaminopropylamine.

With reference now more particularly to the drawing, there is shown a schematic diagram of a typical gas excitation system employed in the practice of the present invention.

Shown in the drawing is a pressurized storage vessel 11 from which an inert gas is admitted into the system through flowmeter 12 and needle valve 13. The inert gas next passes into borosilicate glass discharge chamber 19 wherein an electrical discharge is produced as, for example, by inductive reaction with a field generated by a radio frequency oscillator (105–125 volts A.C., 60 cycles). The resultant excited gas then passes over and bombards polymer 15 which is situated in cup 16, the exhaust gases emerging therefrom and passing out of the system by means of vacuum pump 17. The electronic system comprises a radio frequency oscillator 18 coupled to the gas system by means of solenoid coil 14. A variable capacitor 20 is provided to adjust the frequency of the generator for maximum power transfer to the gas system.

In the operation of the process, the polymer to be treated is wiped with a conventional solvent to remove surface debris and inserted in cup 16. Following, the system is evacuated by means of pump 17 to a pressure of the order of 0.1 mm. of Hg. Thereafter, an inert gas is introduced into the system at a rate dictated by considerations of the capacity of the pumping systems, a partial pressure thereof of approximately 1 mm. of Hg being maintained.

For the purpose of the present invention, the term "inert gas" may be defined as any gaseous substance which is nonreactive with the polymer under ordinary conditions and capable of being excited. The rare gases such as helium, argon, neon, krypton and xenon are suitable in this use. Nitrogen and hydrogen have also been found useful for this purpose as well as mixtures thereof with the rare gases.

Next, the electrical system is turned on and electrical energy transferred directly to a stream of low pressure gas, thereby producing highly excited states as indicated by a characteristic glow observed visually.

The excited gas is permitted to bombard the polymer for a time period of at least one second, such limitation being dictated by practical considerations. There is no maximum upon the duration of bombardment; however, no appreciable improvement in properties is obtained by bombardment beyond 1 minute in the case of polyethylene and 10 minutes in the case of fluorocarbon polymers. Following bombardment, exhaust vapors are removed from the system by means of pump 17.

It will be appreciated by those skilled in the art that the excitation procedure described is merely exemplary and any procedure of the prior art may be utilized for this purpose, as, for example, the use of a Tesla coil, et cetera.

Following bombardment, the polymeric composition is removed from the sample cup, the electrical properties desirably determined and bonding with a conventional epoxy resin adhesive effected.

The epoxy resin is applied uniformly to the surface of a sheet of the fluorocarbon or hydrocarbon polymer and the coated polymer maintained at a temperature ranging from room temperature to a point just below the melting temperature for a time period sufficient to allow curing of the epoxy thereby forming a structural joint between the fluorocarbon or hydrocarbon and the adhesive.

Several examples of the present invention are described in detail below. These examples are included merely to aid in the understanding of the invention, and variations may be made by one skilled in the art without departing from the spirit and scope of the invention.

EXAMPLE I

A 1" x 3" sample of polyethylene, obtained from commercial sources, was washed with acetone, dried in air and inserted in an apparatus similar to that shown in the figure. Following, the system was pumped down to a pressure of the order of 0.1 mm. of Hg and a mixture of hydrogen and helium (90 percent helium-10 percent hydrogen) introduced into the system at a rate of 4 cc./min., a partial pressure of approximately 1 mm. of Hg being maintained. The electrical system was then activated, a characteristic purplish-red glow appearing at 110 volts. The excited gas was permitted to bombard the polyethylene for one second, exhaust gases being removed from the system. Following, the polyethylene was removed from the system and the electrical properties and wettability measured. The electrical properties (surface resistivity) and wettability were found to be unchanged in both the untreated and treated compositions.

An epoxy resin, diglycidyl ether of bisphenol A was selected for use in preparing an epoxy adhesive. The resin, obtained from commercial sources, evidenced an epoxy equivalent weight of 179, a total chloride content less than 0.1 percent by weight, and a viscosity of 6400 centipoises at 25° C.

Diethylaminopropylamine, obtained from commercial sources was distilled under nitrogen through a six inch Vigreux column and the first fraction discarded. The product, distilling at 68° C. and 26 mm. pressure, was stored in a dark container prior to use.

An epoxy resin adhesive was prepared by mixing 100 parts by weight of the above-described resin with 7 parts by weight of the diethylaminopropylamine. The mixture was thoroughly stirred until uniform and applied immediately to the surface of the polyethylene. The resultant assembly was maintained at a temperature of 70° C. for approximately 16 hours.

In order to determine tensile shear strengths of the resultant structures, composites were prepared in accordance with the following procedure:

Metal tensile shear adherends, 5 x 1 x 1/16 inch of 2024–T3 aluminum obtained from commercial sources were selected. The surface of the aluminum adherends was prepared by vapor degreasing in trichloroethylene in accordance with conventional procedures and, subsequently, etching for 7 minutes at 65° C. in a solution comprising 1 part by weight soduim dichromate, 30 parts by weight water and 10 parts by weight of 95 percent sulfuric acid. Following etching, the adherends were rinsed for five minutes in running tap water, for one minute in running distilled water and then dried in a forced air oven at 60° C. The adherends were stored in dessicators and removed just prior to use.

For the measurement of tensile shear strengths, composite test pieces comprising aluminum-epoxy adhesive-polyethylene-epoxy adhesive-aluminum were prepared for bonding in a device designed to maintain a one-half inch overlap, the thickness of the epoxy adhesive being maintained constant by insertion of a piece of 0.003 inch diameter wire in each glue line between the aluminum and polyethylene. Bonding of the aluminum to the epoxy adhesive-polyethylene structure was effected at a pressure of 20 pounds per square inch by placing the composites in forced air ovens maintained at 70° C. for sixteen hours. The bonded structures were tested in accordance with ASTM D1002–53T, except that the strain rate was 0.1 inch per minute. The tensile shear strength of the structure was approximately 2000 pounds per square inch at 23° C.

EXAMPLE II

The procedure of Example I was repeated employing helium as the inert gas. The bombarded polyethylene manifested electrical and wettability properties identical to that of the starting material. The resultant bonded structure evidenced a tensile shear strength of 2500 at 23° C.

EXAMPLE III

The procedure of Example I was repeated employing polytetrafluoroethylene and bombarding for 10 minutes. The bombarded polymer evidenced electrical and wettability characteristics identical to that of the starting material. The resultant bonded structure manifested a tensile shear strength of 1000 at 23° C.

EXAMPLE IV

The procedure of Example II was repeated employing polytetrafluoroethylene and bombarding for 10 minutes. The bombarded polymer evidenced electrical and wettability characteristics identical to that of the starting material. The resultant bonded structure manifested a tensile shear strength of 1000 at 23° C.

EXAMPLE V

The procedure of Example I was repeated employing polyvinylfluoride. The bombarded polymer evidenced electrical and wettability characteristics identical to that of the starting material. The resultant bonded structure manifested a tensile shear strength of 2500 at 23° C.

EXAMPLE VI

The procedure of Example I was repeated employing hexafluoropropylene-tetrafluoroethylene copolymer. The bombarded polymer evidenced electrical and wettability characteristics identical to that of the starting material. The resultant bonded structure manifested a tensile shear strength of 1300 at 23° C.

EXAMPLE VII

The procedure of Example II was repeated with the exception that nylon, obtained from commercial sources was employed. The tensile shear strength of the resultant structure was approximately 3200 p.s.i. at 23° C.

What is claimed is:
1. A polymer selected from the group consisting of (a) hydrocarbons, (b) fluorocarbons, and (c) polyamides, said polymer having been subjected to a stream of an excited inert gas for a time period sufficient to form a bond with an adhesive, said gas having been excited in an electrodeless electrical discharge at subatmopsheric pressure with low energy radiation of the radio frequency type and serving as an energy transfer source.

2. Polymer in accordance with claim 1 comprising polyethylene.

3. Polymer in accordance with claim 1 comprising tetrafluoroethylene.

4. Polymer in accordance with claim 1 comprising polyvinylfluoride.

5. Polymer in accordance with claim 1 comprising nylon.

6. Polymer in accordance with claim 1 wherein said inert gas is helium.

7. Polymer in accordance with claim 1 wherein said inert gas is a mixture of helium and hydrogen.

8. A method of forming a seal between a polymer and an adhesive, the said polymer being selected from the group consisting of hydrocarbons, fluorocarbons, and polyamides, and having been subjected to a stream of an excited inert gas for a time period of at least one second which comprises positioning said adhesive upon said polymer after the said polymer has been subjected to said stream of excited inert gas and maintaining the resultant assembly at a temperature below the melting point of said polymer for a time period sufficient to cure the said adhesive, said gas having been excited in an electrodeless electrical discharge at subatmospheric pressure with low energy radiation of the radio frequency type.

9. Method in accordance with claim 8 wherein said polymer is polyethylene.

10. Method in accordance with claim 8 wherein said polymer is tetrafluoroethylene.

11. Method in accordance with claim 8 wherein said polymer is polyvinylfluoride.

12. Method in accordance with claim 8 wherein said polymer is nylon.

13. Method in accordance with claim 8 wherein said adhesive is an epoxy adhesive.

References Cited

UNITED STATES PATENTS

| | | | |
|---|---|---|---|
| 3,291,712 | 12/1966 | McBride | 204—168 X |
| 3,387,991 | 6/1968 | Erchak | 204—165 X |
| 3,391,044 | 7/1968 | Kaghan et al. | 156—272 |
| 3,391,070 | 7/1968 | Morgan | 204—168 |
| 2,940,869 | 6/1960 | Graham | 204—159.14 X |
| 2,977,495 | 3/1961 | Klein | 250—41.9 X |
| 2,989,452 | 6/1961 | D'Alelio | 204—159.14 X |
| 3,018,189 | 1/1962 | Traver | 204—159.2 X |
| 3,057,792 | 10/1962 | Frohlich | 204—165 |
| 3,084,114 | 4/1963 | Gilbert et al. | 204—159.14 X |
| 3,097,150 | 7/1963 | Rainer et al. | 204—159.2 |
| 3,291,715 | 12/1966 | Anderson | 204—312 X |
| 3,347,772 | 10/1967 | Laegreid et al. | 313—231 X |

HAROLD ANSHER, Primary Examiner

U.S. Cl. X.R.

117—47; 156—3, 330; 204—168, 159.2; 250—41.9; 260—2; 264—22; 313—231